(No Model.)

J. CRONAN.
HOISTING TACKLE.

No. 360,859. Patented Apr. 12, 1887.

Witnesses
R. H. Sanford
A. M. Gaskill

Inventor
John Cronan
By A. C. Paul
Atty.

N. PETERS. Photo-Lithographer, Washington, D. C.

UNITED STATES PATENT OFFICE.

JOHN CRONAN, OF MINNEAPOLIS, MINNESOTA.

HOISTING-TACKLE.

SPECIFICATION forming part of Letters Patent No. 360,859, dated April 12, 1887.

Application filed August 3, 1886. Serial No. 209,875. (No model.)

*To all whom it may concern:*

Be it known that I, JOHN CRONAN, of Minneapolis, in the county of Hennepin and State of Minnesota, have invented a new and useful Apparatus for Raising and Supporting Hoisting-Tackle and other Devices, of which the following is a specification.

This invention relates to improvements in means for securing the upper block of a tackle to a fixed bracket or support; and the invention consists, generally, in a support provided with an automatic clutch and means for raising the upper block of a tackle, or other devices that it is desired to support, to said clutch, where it is automatically engaged, and means for disengaging the clutch at pleasure.

The invention further consists in the constructions and combinations hereinafter described, and pointed out in the claims.

Heretofore, in order to attach a hoisting-tackle to a bracket or support in an elevated position, it has been necessary to carry up the upper block of the tackle and hook it to the support. This is very inconvenient, and it is equally inconvenient to remove the tackle after it has once been placed in position. My invention obviates these objections, as by its use the upper block may be hoisted to its support, with which it will be automatically engaged, and when it is desired to remove the tackle the clutch can be operated from the ground or floor to release it.

Figure 1:
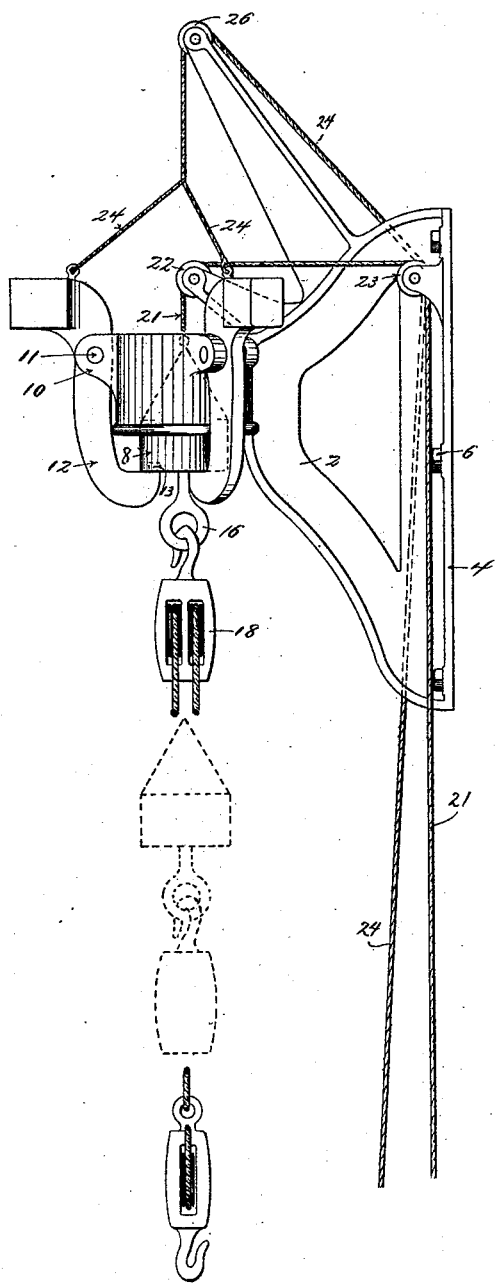
Figure 2:
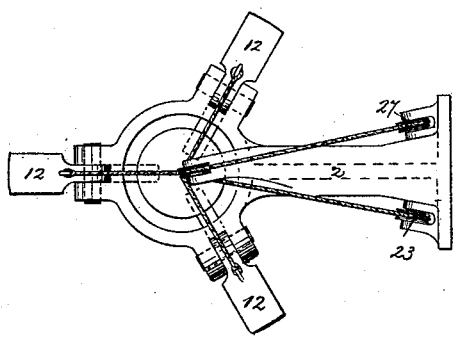

In the drawings which form part of this specification, Figure 1 is a side elevation of my improved device. Fig. 2 is a plan view of the same, and Fig. 3 is a partial cross-section.

2 is a bracket, preferably of cast metal, having flanges 4, provided with bolts 6, for holding it in position. The outer end of the bracket terminates in the cylindrical portion 8, which is formed hollow and provided with lugs 10 upon its outer surface. This bracket supports a clutch composed of the pivoted arms or levers, made, preferably, of the form shown in Figs. 1 and 3, the lower portions, 13, being turned inward toward the center. The tops are turned outward and formed into counter-weights, for the purpose of keeping the levers in their perpendicular or normal position. They are attached to the lugs 10 by fulcrum-pins 11. I have shown in the drawings, and prefer to use, three of these levers; but it might be desirable under some circumstances to use two or four, in which case the construction and operation would be substantially the same.

Figure 3:
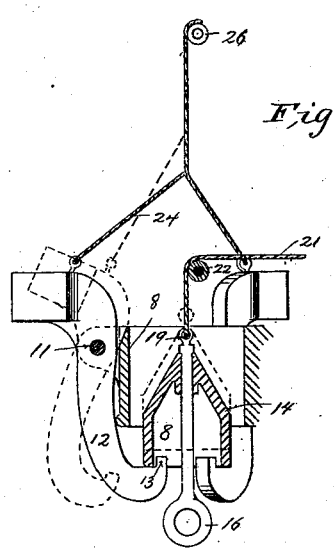

14 is a cone shaped block, which may be formed hollow, as shown in Fig. 3. This block is made less in diameter than the cylinder 8 or the bracket, so that it will freely pass into said cylinder. The lower edge of this cone rests upon the levers 12, and the hook 13 upon the lower extremity of the levers may enter the hollow of the cone, to prevent the levers from being accidentally released. A ring or hook, 16, is secured centrally to the bottom of the cone. This ring receives the hook upon the block 18. Upon the top or apex of the cone I place another ring or hook, 19, to which the rope 21 is attached. This rope is passed over the pulley 22, located directly above and in line vertically with the cone, and back to another pulley, 23, conveniently located upon the bracket, and thence down within reach of the operator. The pulley 22 is mounted on any suitable support. A rope, 24, is attached to each of the levers 12 above the fulcrum 11. These ropes are preferably united, and are passed over the pulley 26, thence over a pulley, 27, located upon the bracket, and downward to a point within reach of the operator.

The operation is as follows: The upper block of the tackle is attached to the ring 16 upon the cone 8. The cone is then raised by means of a rope, 21, until it strikes the hook-shaped levers 12. The cone, still advancing, forces out the lower portion of the levers, causing them to oscillate upon the fulcrum-pin 11 and take the position shown in dotted lines in Fig. 1. They remain in this position until the cone has passed the point 13 upon the said levers, when the counter-weight upon the top of the levers forces them back to their normal position, and their lower extremities pass under the cone. The rope 21 can now be released, and the cone will rest upon the levers and the weight upon the block will be transmitted through the levers directly to the bracket or gibbet to which it is attached. When it is desired to remove the tackle, the rope 21 is first operated to raise the cone and take the weight off the lever. The ropes 24 are then drawn up, and the levers 12, to which the ropes are attached, are drawn together, which movement causes their lower portions to be forced outward to the position shown in dotted lines in Fig. 1, and entirely free from the cone, which can then be lowered, as shown in dotted lines in Fig. 1. The tackle can then be removed and the cone drawn up and clutched by the levers. The means for supporting the clutch-levers may be varied, and the apparatus may be mounted upon any suitable bracket, beam, or other supporting device.

Any suitable means may be used to support the pulley over which the rope 24 passes.

The apparatus may be used for raising, supporting, or lowering fire-escape or other ladders or ropes, or any other devices for which it is adapted.

The supporting-bracket may be secured to the wall of a building or over a hatchway, or in any other position where it may be desired to use it.

I claim as my invention—

1. The combination, with the support, of the pivoted clutch-levers 12, the ropes 24, for operating said levers, the cone-shaped block 8, and the rope 21, for raising and lowering said block.

2. The combination, in an apparatus of the class described, of a series of clutch-levers, 12, operating means for moving said levers, a cone-shaped carrying-block, 8, adapted to enter between and be engaged by said levers, and a rope, 21, for raising or lowering said block, substantially as described.

3. The combination, in an apparatus of the class described, of the series of clutch-levers 12, having the upturned lower ends, and the counter-weights upon the said levers, the ropes 24, for operating said levers, the pulley 26, the cone-shaped block 8, having the opening in its lower end, and the rope 21, for raising and lowering said block, all substantially as described.

In testimony whereof I have hereunto set my hand this 29th day of July, 1886.

JOHN CRONAN.

In presence of—
A. C. PAUL,
C. F. BAKER.